United States Patent [19]

Ilich

[11] 4,262,660
[45] Apr. 21, 1981

[54] SOLAR COOKER

[76] Inventor: Daniel F. Ilich, 149-44 Cherry Ave., Flushing, N.Y. 11255

[21] Appl. No.: 63,060

[22] Filed: Aug. 2, 1979

[51] Int. Cl.³ .............................................. F24J 3/02
[52] U.S. Cl. .................................. 126/451; 126/438; 126/426; 350/292
[58] Field of Search ............... 126/451, 438, 9 R, 426; 350/292

[56] References Cited

U.S. PATENT DOCUMENTS

| 2,859,745 | 11/1958 | von Brudersdorff | 126/451 |
|-----------|---------|------------------|---------|
| 2,994,318 | 8/1961  | Lee              | 126/451 |
| 3,256,207 | 5/1966  | Lowell           | 350/292 |
| 4,083,357 | 4/1978  | Fischer          | 126/451 |
| 4,130,106 | 12/1978 | Clevett          | 350/292 |

Primary Examiner—Samuel Scott
Assistant Examiner—Gerald Anderson
Attorney, Agent, or Firm—Arthur T. Fattibene

[57] ABSTRACT

This disclosure is directed to a portable, knock down, solar cooker having a box-shaped supporting body to which an expandible parabolic reflector and associated solar oven can be readily assembled and disassembled without the use of any hand tools, and in the disassembled position the component parts can be readily stowed within the box shaped supporting body.

The solar cooker also includes a foldable parabolic reflector associated with a solar oven which has a circumscribing shield to define a confined air space about the solar oven in the erected position to enhance the efficiency thereof.

5 Claims, 11 Drawing Figures

U.S. Patent  Apr. 21, 1981  Sheet 1 of 2  4,262,660
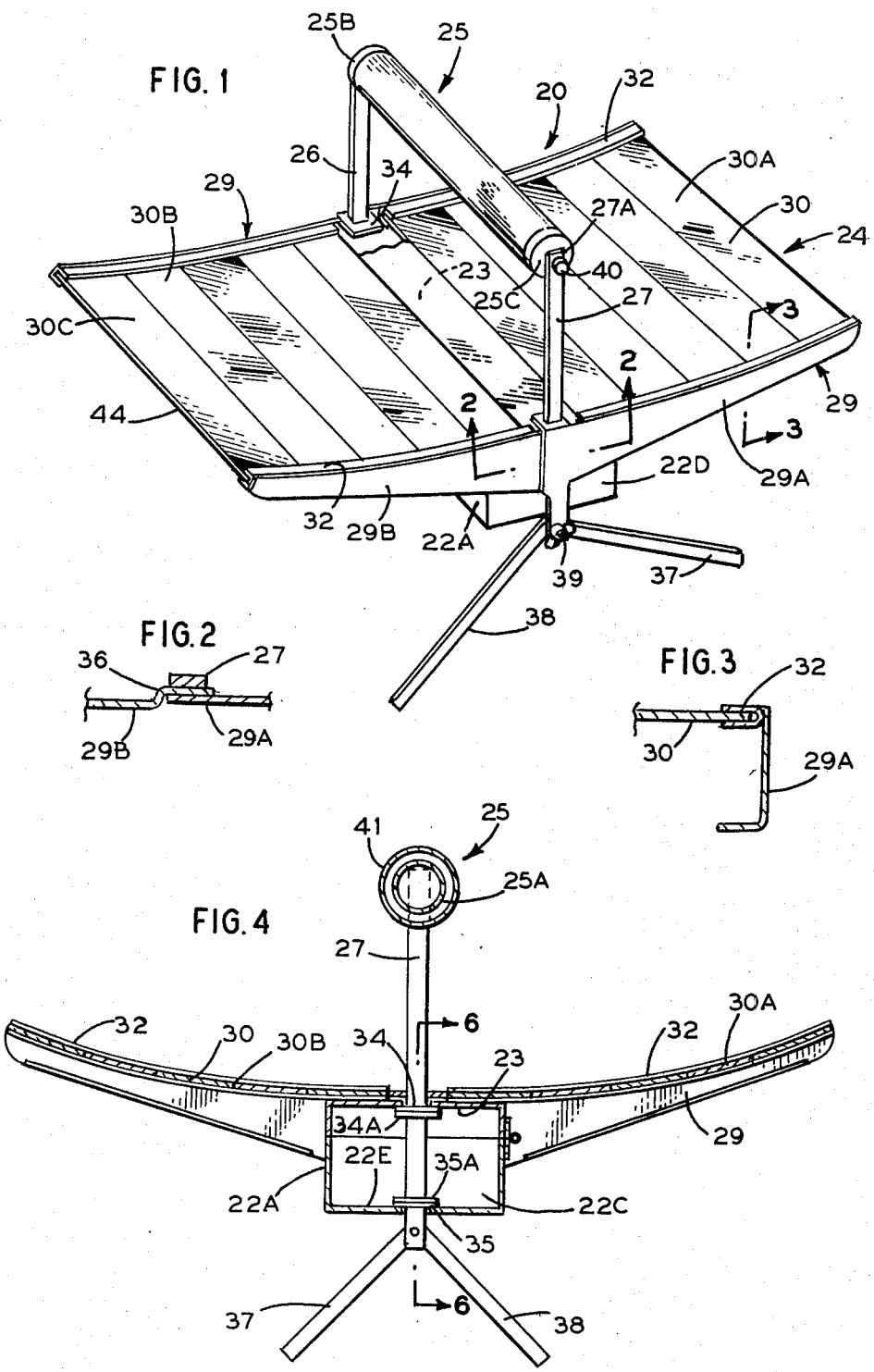

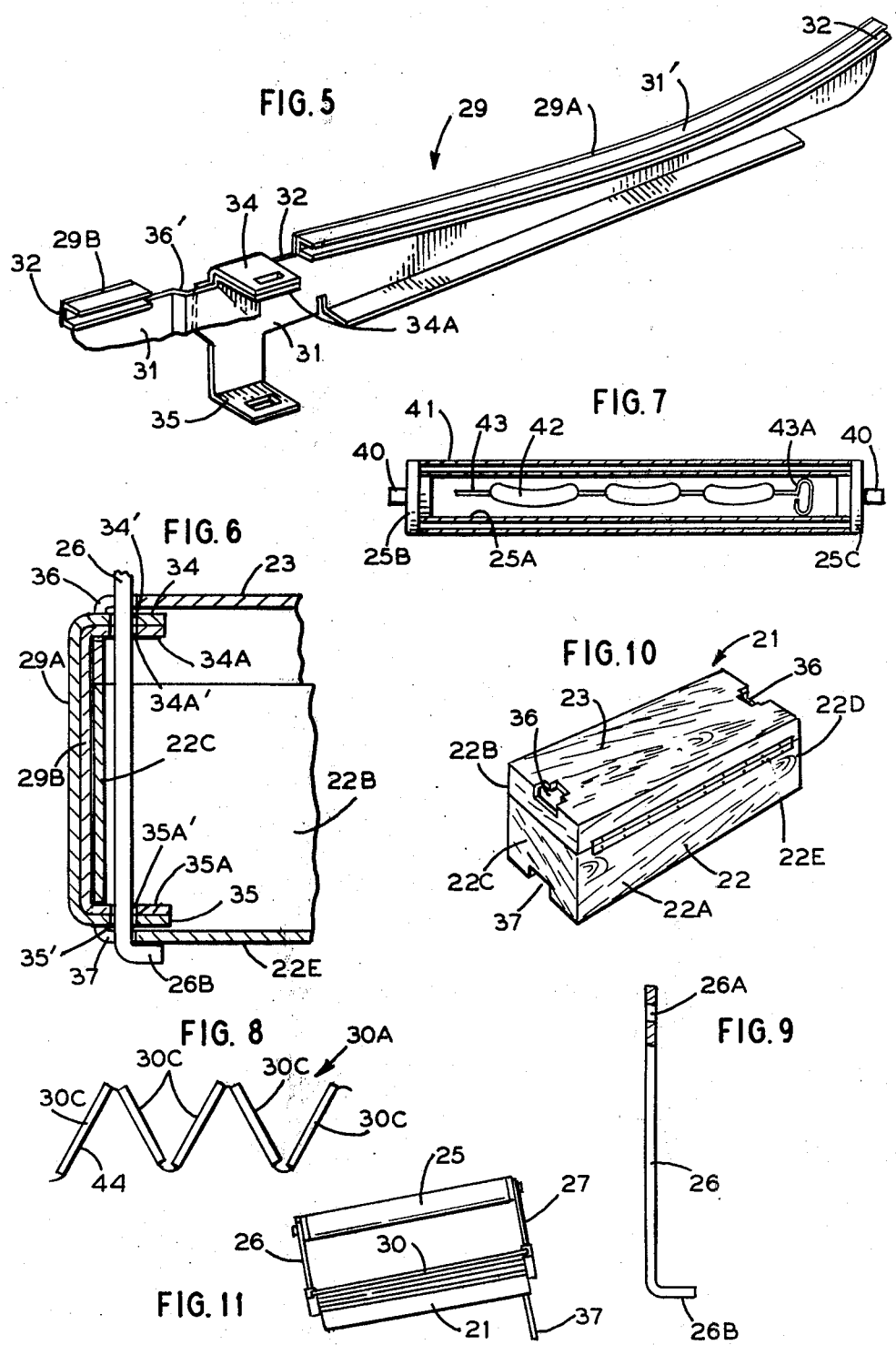

SOLAR COOKER

PRIOR ART

Heretofore, numerous efforts have been made to develop a practical and workable solar cooker. In view of the present day energy crisis, the desire for a simple, portable, and efficient solar cooker is ever increasing. The following noted U.S. Patents are exemplary of the known efforts made by others to attain a practical and workable solar cooker; viz. U.S. Pat Nos. 2,859,745; 2,945,417; 2,994,318; 2,998,002; 3,053,248; 2,326,227; 3,391,688; 3,896,786; 3,938,497; 3,990,914; 4,023,555; 4,083,357; and 4,130,106.

OBJECTS

An object of this invention is to provide an improved portable, readily knock down, solar cooker which can be readily assembled and disassembled without the use of any hand tools.

Another object is to provide a solar cooker having a construction whereby the respective component parts can be readily stored within the support body of the solar cooker when in the knock down position.

Another object is to provide a portable knock down, solar cooker having an improved parabolic reflector and associated oven construction for obtaining maximum utilization of the sun's available energy.

Another object resides in the provision of a portable solar oven or cooker which is relatively simple in construction; can be readily fabricated; and which is positive in operation.

BRIEF SUMMARY OF THE INVENTION

The foregoing objects and other features and advantages are attained by a solar cooker which includes a box shaped support to which the component parts such as the parabolic reflector and associated oven are attached in the erected position, and in which the component parts are stored in the disassembled or knock down position. The component parts comprise a pair of arms for detachably supporting therebetween a foldable parabolic reflector. Each of the respective arms include a pair of complementary arm segments which have overlying complementary end portions which are particularly constructed with inturned tabs having aligned openings which are adapted to extend into the box shaped body and which arms are rigidly held in assembled position by the insertion through the aligned openings a stanchion. The oven of the cooker is supported between the upper ends of opposed stanchions in predetermined spaced relationship to the parabolic reflector extended between the opposed arms fixed to the body by the stanchions. The oven construction comprises a tubular member in which the comestibles to be cooked is placed. Spaced about the tubular oven member is a transparent shield to define a confined space about the tubular oven.

Connected to one of the stanchions are a pair of leg members which are pivoted to adjust the inclination of the solar cooker relative to the sun.

FEATURES

A feature of this invention resides in the provision of a solar cooker having a minimum of component parts which are relatively simple in construction and which can be readily assembled to define a sturdy and readily portable cooker which can be easily and quickly assembled and disassembled.

Another feature resides in the provision of a pair of extensible arms which are detachably connected to the body portion of the solar cooker for supporting therebetween a foldable parabolic reflector which is provided with a curvilinear surface and which is disposed relative to the associated oven so that sun's rays striking the reflector are directed and focused toward the central axis of the oven for maximum efficiency.

Another feature of this invention resides in the provision in which each of the extensible arms are constructed as two complementary arm segments which have overlying complementary end portions that are detachably secured to the body of the cooker by the stanchions.

Another feature resides in the provision in which the optimum relationship between the reflector and the oven is maintained relatively fixed and assured in each assembly operation.

Other features and advantages will become apparent when considered in view of the drawings and description in which:

FIG. 1 is a perspective view illustrating an embodiment of this invention.

FIG. 2 is a sectional detail taken on line 2—2 in FIG. 1.

FIG. 3 is a sectional detail taken along 3—3 on FIG. 1.

FIG. 4 is a sectional view of the embodiment of FIG. 1.

FIG. 5 is a detail fragmentary perspective view of the reflector supporting arms having portions broken away.

FIG. 6 is a sectional view taken along line 6—6 on FIG. 4.

FIG. 7 is a longitudinal sectional view taken through the solar oven.

FIG. 8 is a detail sectional view of the folding reflector shown in a partially folded position.

FIG. 9 is a detail view of a stanchion.

FIG. 10 illustrates the solar cooker in the stowed position.

FIG. 11 is a side view of the solar cooker in an erected operative position.

DETAIL DESCRIPTION

Referring to the drawings, there is illustrated a solar cooker 20 which embodies the present invention. The illustrated solar cooker 20 is a portable type which can be readily assembled from its stowed position wherein all of the component parts are stored in the box shaped housing 21 as seen in FIG. 10, to its operative assembled form as best seen in FIG. 1.

The solar cooker 20 comprises its box shaped body portion 21 which is defined by a body portion 22 formed as a rectangular box having opposed side walls 22A and 22B; interconnected end walls 22C and 22D, and a bottom wall 22E. A hinged cover 23 is connected to the box body 22. The arrangement is such that the box shaped housing 21 described functions as a support for maintaining the components of the solar cooker in the assembled position, as will be hereinafter described, and as a storage box for the components in the knock down position.

Essentially, the solar cooker 20 comprises the box shaped housing 21, a foldable solar reflector 24, the collector or solar oven or cooking recepticle 25, and a pair of opposed stanchions 26 and 27 which function to maintain the component parts in the assembled position and to fixedly locate the oven or recepticle 25 at the focal center of the reflected sun rays.

Referring to FIGS. 1 and 2, the reflector means 24 comprises a pair of opposed support arms 29—29, which are secured to the respective ends 22C and 22D of the box shaped housing 21 as will be hereinafter described, and a foldable reflector 30 supported therebetween. Each of the opposed arms 29; 29 as best seen in FIGS. 1, 4, and 5 comprise a pair of complementary arm segments 29A and 29B which are somwhat similar in construction but opposite in hand. Each arm segment 29A and 29B has a side portion 31 having an upper edge 31' having a curvilinear contour to which a "C" shaped track 32 is connected. The track 32 of the respective oppositely disposed arms 29 define a guideway for receiving the edge portion of a flexible reflector 30. As best seen in FIG. 1, the reflector 30 comprises two half sections 30A and 30B which are slid into the opposed complementary tracks 32.

Referring to FIGS. 5 and 6 each complementary arm segments 29A, 29B is provided at its inner end portion with upper and lower inturned tabs. For example, arm segments 29A at its inner end is provided with spaced inturned tabs 34 and 35. The inner end portion of complementary arm segments 29B is provided with upper and lower inturned tabs 34A and 35A. The respective tabs 34, 35, and 34A, 35A are each provided with respective openings 34', 35' and 34A', 35A'; which in the assembled position are disposed in alignment as seen in FIGS. 5 and 6. If desired, arm 29B may be provided with an offset as seen at 36' in FIGS. 2 and 5 so that the inner end of arm 29 may overlap the inner portion of arm 29B. For reasons which will be hereinafter apparent, the holes 34', 35' and 34A' and 35A' are sized to conform to the shape of the respective stanchions 26 and 27.

As best seen in FIG. 10, the side portions 22C and 22D of the box body 21 are each provided with a T shaped type slot 36, 37 adjacent to the top and bottom thereof respectively.

The respective stanchions 26 and 27 are each formed of a suitable flat bar or stock, each of which is provided with an opening 26A and 27A adjacent to the upper end thereof. The lower end of stanchion 26 is laterally bent as indicated at 26B. The lower end of stanchion 27 has connected thereto a pair of adjustable leg extensions 37 and 38. The respective leg extensions are adjustably connected to the stanchion 27 by a fastener or bolt 39. It will be understood that the leg extensions are adjustably connected to stanchion 27 and can be adjustably secured in any adjusted position by tightening of the fastener 39; which comprises a bolt and a wing nut. The arrangement is such that one end of the cooker 20 can be raised or lowered accordingly by adjusting the angle or spread of the respective leg extensions as noted in FIG. 1. Thus, the angle of the cooker 20 in its set up position can be varied in accordance to the angle of the sun rays.

The collector or oven portion 25 comprises a tubular body 25A which is closed at each end by end walls 25B and 25C, one or both of which is rendered readily detachable connected to the tubular body 25A; so as to provide access to the tubular body. If desired, suitable seals may be provided about the end walls 25B and 25C to provide a fluid tight closure with body 25. In the illustrated embodiment, the end walls 25B and 25C are provided with an extending boss or pin 40 which is adapted to be received in the opening 26A and 27A of the corresponding stanchion 26 and 27. It will be understood that the outer surface of the tubular body 25A may be painted or colored black for maximum absorption of the sun's rays.

Supported between the end walls 25B and 25C and in spaced relationship to the body 25A is a transparent shield 41. The shield 41 functions to define and maintain a closed space about the oven or collector body 25A to confine the absorbed heat within said space, and which shield also functions to prohibit the winds or air current from circulating directly about the collector body 25A, which if permitted would greatly reduce the overall efficiency of the solar oven or collector body 25A.

The curvature of the solar reflector 30 is defined by the curvilinear tracks 32 so that sun rays reflecting therefrom are focused or concentrated on the solar collector or tubular body 25A. The solar reflector 30 is generally parabolic in shape and has a curvature constructed so that the angle of incidence of the sun rays striking the surface of the reflector equals the angle of deflection so that virtually all of the sun's rays are concentrated on the collector or oven 25.

The comestible or liquid desired to be heated is placed in the tubular collector or oven 25. As shown in FIG. 7, solid foods such as meats 42 can be cooked on a skewer 43. The skewer 43 is constructed with a crosshead or end portion 43A which is sized to frictionally engage the internal surface of the collector or oven 25, and is thus rendered self-supporting within the oven.

Referring to FIG. 8, the reflector sections 30A and 30B are made foldable by adhesively securing sections 30C of the reflectors to a readily foldable or flexible backing material 44. With the construction described, the reflector sections 30A and 30B can be readily folded in the manner of an accordian fold so that in the knock down position the reflector 30 as well as the other described components can be readily stowed within the box shaped body 21.

To assemble the solar cooker 20, the respective arm segments 29A and 29B are disposed so that the inner end portions are disposed in overlapping position so that the holes 34' and 35' are disposed in alignment with holes 34A' and 35B.' With the respective arm sections so disposed, the center tab portions are inserted into the aligned T shaped slots 36 and 37 of the box body 21. With the arm segments positioned so that tabs and their respective openings projecting into the box body 21, a stanchion member e.g. 26 is inserted from beneath the box body 21 so as to pass up through the aligned openings 37, 35', 35A', 34A,' 34' and 36. The stanchion is extended through said aligned openings until it is limited by the bent lower end 26B against the bottom 22E of the body.

The other pair of arm segments are assembled and secured to the other side of the box body by stanchion 27. With the respective stanchions 26 and 27 so placed, the respective arm segments 29A and 29B as rigidly secured to the opposed sides of the body without the need of any extraneous tools or fastening means.

The collector or oven can then be detachably connected between the upper ends of the respective stanchions 26 and 27 by inserting the pins 40 on the end portions 25B and 25C into the corresponding holes 26A and 27A in the ends of stanchions.

The reflector sections 30A and 30B are assembled by sliding the opposed edges thereof through the guideway defined by the opposed track portions 32 of the respective arm segments.

To tilt the assembled cooker 20 as may be desired to due to the position of the sun, the respective leg extensions connected to stanchion 27 may be spread apart or brought closer together as may be required so as to position the reflector to capture and reflect the maximum amount of the sun's rays.

From the construction described, it will be noted that the relative position of the collector or oven 25 is maintained in a fixed relationship to the reflector in the assembled position.

To disassemble, the steps are reversed and the cooker can be readily disassembled and assembled in a matter of seconds without the aid of any extraneous tools or parts. Also the component parts including the reflector and collector or oven can be readily stowed within the box shaped body thereby assuring that none of the component parts become lost or misplaced as is frequently the case with readily knock down type of devices.

While the foregoing invention has been described with respect to a particular embodiment thereof, it will be appreciated and understood that variations and modifications may be made without departing from the spirit or scope of the invention.

What is claimed is:

1. A portable knock down solar cooker comprising
a box shaped body having opposed end portions, a connected bottom, and a cover adapted to define a housing for storing the component parts in the knock-down position and a support for said solar cooker in the assembled position,
a pair of complementary arm segments disposed adjacent to each opposed end portion of said housing, said arm segments extending laterally from said body,
a reflector removeable supported between said arm segments,
a pair of uprights stanchions detachably securing said arm segments to said body in the assembled position,
and a solar oven detachably interposed between the upper ends of said stanchions in spaced relationship to said reflector,
said pair of complementary arm segments each includes complementary inner end portions, each inner end portions terminating in an upper and lower inturned tab portion, each of said upper and lower tab portions having an aligned opening therein, said inner end portion of said complementary pair of arm segments being disposed in overlapping relationship in the assembled position so that the openings in said upper and lower tab portions are disposed in alignment, said box shaped body having vertically spaced slotted openings in the ends thereof adapted to receive said tab portions in the assembled relationship, and said stanchion being extended through said slotted openings and aligned openings in said tab portion for detachably securing said complementary arm segments to said box body.

2. A portable knock down solar oven as defined in claim 1 and including a pair of leg members, and means for pivotally connecting said leg members to one of said stanchions whereby said leg members can pivot between a vertical and horizontal position relative to said connected stanchions so as to vary the angular relationship between the reflector and the sun.

3. A portable knock down solar cooker as defined in claim 1 wherein said pair of arm segments includes a curvilinear track extending along an edge portion thereof, said reflector being removeably supported between the complementary track of opposed arm segments and said curvilinear track defining a parabolic curve relative to the axis of the oven body so that the angle at which the sun's rays strike the reflector equal the angle of deflection.

4. A portable knock down solar cooker comprising
a support including
a box shaped body having opposed side walls, interconnected ends walls, and a bottom wall,
a cover for said box shaped body hingedly connected to one of said side walls, whereby said box shaped body and cover defines a housing for storing the component parts of said solar cooker in the knock down position and a support for said solar cooker in the operative assembled position thereof,
a pair of complementary arm segments adapted to be oppositely disposed adjacent to each end wall of said box shaped body,
said arm segments extending laterally from said box shaped body,
said pair of arm segments each having complementary inner end portions adapted to be disposed in overlying relationship in the assembled position,
said complementary inner end portions having laterally disposed upper and lower inturned tabs disposed in vertically spaced relationship,
each of said tabs having an aligned opening formed therein;
said end walls adjacent to said bottom wall and said cover having opposed angular slots formed therein whereby said inturned upper and lower tab portions in the assembled position of said arm segments are adapted to be received in said angular slots,
a pair of stanchions, each stanchion being adapted to be inserted through said respective slots and aligned openings of said upper and lower tab portions for securing said complementary arms to the end portions of said support in the assembled position,
said complementary arm portions including a curvilinear track defining a parabolic curve,
a foldable reflector removably supported between opposed arm segments,
a solar oven detachably connected between the upper ends of said stanchions in spaced relationship to said reflector,
said solar oven including a tubular oven,
end plates closing the ends of said tubular oven,
a transparent shield circumscribing said oven in spaced relationship between the end plates of said oven,
said transparent shield defining with said end plates a confined, closed air space about said oven;
and a pair of adjustable leg members pivotally connected to one of said stanchions whereby said leg members can be adjusted to vary the inclination of said reflector relative to the sun.

5. The portable knock down solar cooker comprising a box shaped body having opposed end portions, a connected bottom, and a cover adapted to define a housing for storing the component parts in the knock down position and a support for said solar cooker in the assembled position, a pair of complementary arm segments disposed adjacent to each opposed end portion of said housing, said complementary arm section each having complementary inner end portions wherein said arm sections in the assembled position thereof extends laterally from said body, a reflector removeably supported between said arm section, a pair of upright stanchions, said complementary inner end portions of said pair of complementary arm sections having means for receiving one of said upright stanchions whereby said upright stanchions detachably secure said arm sections to said body in the assembled position, a solar oven detachably interposed between the upper ends of said stanchions in spaced relationship to said reflector, said solar oven including a tubular oven body for receiving the comestibles to be cooked, end plates for sealing the end of said tubular oven body, a transparent windshield circumscribing said oven body between the said end plates and spaced relationship to said oven body, a skewer supported within that oven body for maintaining the comestibles to be cooked centrally located within said oven body, said skewer including a longitudinally extending needle-like blade and a transversely connected head end portion, said head end portion having a length substantially equal to the internal diameter of said solar oven body whereby said skewer head end portion is frictionally retained in position within said oven body.

* * * * *